(12) United States Patent
Nager et al.

(10) Patent No.: US 9,254,924 B2
(45) Date of Patent: Feb. 9, 2016

(54) PRESSURE INFLUENCING ASSEMBLY FOR AN AIRCRAFT AUXILIARY SYSTEM

(75) Inventors: Eric Andrew Nager, El Cajon, CA (US); Anthony C. Jones, San Diego, CA (US); Behzad Hagshenas, San Diego, CA (US); Nagamany Thayalakhandan, San Diego, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 806 days.

(21) Appl. No.: 13/208,824

(22) Filed: Aug. 12, 2011

(65) Prior Publication Data

US 2013/0037122 A1 Feb. 14, 2013

(51) Int. Cl.
*B64D 41/00* (2006.01)
*B64D 33/02* (2006.01)

(52) U.S. Cl.
CPC ........ *B64D 41/00* (2013.01); *B64D 2033/0213* (2013.01); *Y10T 137/0536* (2015.04)

(58) Field of Classification Search
CPC .......... B64D 41/00; B64D 2033/0213; B64D 2041/002; Y10T 137/0536; Y10T 137/0645
USPC ..................... 60/801; 137/15.1; 244/58, 53 B
See application file for complete search history.

(56) References Cited

U.S. PATENT DOCUMENTS

| | | | |
|---|---|---|---|
| 5,343,778 A * | 9/1994 | Romero et al. ................. 74/661 |
| 5,655,359 A * | 8/1997 | Campbell et al. ............... 60/772 |
| 6,092,360 A | 7/2000 | Hoag et al. |
| 6,272,838 B1 * | 8/2001 | Harvell et al. ................... 60/783 |
| 6,817,571 B2 * | 11/2004 | Retz et al. ........................ 244/15 |
| 6,942,181 B2 | 9/2005 | Dionne |
| 7,337,605 B2 * | 3/2008 | Hagshenas ................... 60/39.08 |
| 7,469,545 B2 | 12/2008 | Riley |
| 7,540,142 B2 | 6/2009 | Sheoran et al. |
| 7,578,369 B2 | 8/2009 | Francisco et al. |
| 7,600,714 B2 * | 10/2009 | Sheoran et al. ............. 244/53 B |
| 7,698,896 B2 * | 4/2010 | Sheoran et al. ................. 60/770 |
| 7,765,784 B2 * | 8/2010 | Lwasa et al. .................... 60/39.5 |
| 8,141,816 B2 * | 3/2012 | Robbins et al. ............. 244/53 B |
| 8,371,521 B2 * | 2/2013 | Napier et al. .................... 244/58 |
| 2006/0163425 A1 * | 7/2006 | Brown et al. ................ 244/53 B |
| 2007/0022731 A1 | 2/2007 | Sheoran et al. |
| 2008/0078863 A1 | 4/2008 | Lwasa et al. |
| 2008/0098743 A1 | 5/2008 | Judd |
| 2009/0152406 A1 | 6/2009 | Francisco |
| 2010/0221104 A1 | 9/2010 | Light et al. |
| 2011/0049291 A1 * | 3/2011 | Piezunka ........................ 244/54 |
| 2012/0146403 A1 * | 6/2012 | Mavier et al. .................. 307/9.1 |

\* cited by examiner

*Primary Examiner* — Phutthiwat Wongwian
*Assistant Examiner* — Jason H Duger
(74) *Attorney, Agent, or Firm* — Carlson, Gaskey & Olds, P.C.

(57) ABSTRACT

An exemplary pressure influencing assembly for an aircraft auxiliary system an inlet opening to an aircraft auxiliary system and an exhaust opening from the aircraft auxiliary system. Both the inlet opening and the exhaust opening face at least partially radially away from an axis. At least some of the inlet opening is circumferentially aligned with at least some of the exhaust opening relative to the axis.

18 Claims, 3 Drawing Sheets

US 9,254,924 B2

PRESSURE INFLUENCING ASSEMBLY FOR AN AIRCRAFT AUXILIARY SYSTEM

BACKGROUND

This disclosure relates generally to an aircraft auxiliary system and, more particularly, to influencing back pressure at an exhaust of the aircraft auxiliary system.

Auxiliary systems are used in many aircraft. One example auxiliary system, an auxiliary power unit (APU), mounts to structural members within a tail cone of the aircraft. Aircraft skin secured to the structural members encloses the APU within a cavity. Other auxiliary systems are located in other areas of the aircraft.

An inlet duct extends from an outer surface of the aircraft skin to the auxiliary system. Fluid communicates to the auxiliary system through the inlet duct. A door may selectively cover an opening to the inlet duct to restrict flow to the auxiliary system. An exhaust duct communicates exhausted fluid from the auxiliary system.

As known, back pressure is a function of the air flowing over outwardly facing surfaces of the aircraft skin interacting with the exhausted fluid. If the back pressure is relatively high, the efficiency of the auxiliary system may undesirably decrease. For example, relatively high back pressure levels can reduce flow through the APU, which inhibits the ability of the APU to cool an aircraft cabin.

SUMMARY

An exemplary pressure influencing assembly for an aircraft auxiliary system includes an inlet opening to an aircraft auxiliary system and an exhaust opening from the aircraft auxiliary system. Both the inlet opening and the exhaust opening face at least partially radially away from an axis. The exhaust opening is positioned within a flowpath from the inlet opening.

An exemplary pressure influencing assembly for an aircraft auxiliary system includes an aircraft auxiliary system arranged within a cavity established by an aircraft skin. The aircraft auxiliary system has a rotational axis. An inlet duct communicates an inlet flow radially through an inlet opening in the aircraft skin to the aircraft auxiliary unit. An exhaust duct communicates an exhaust flow radially through an exhaust opening in the aircraft skin away from the auxiliary power unit. The inlet opening is at least partially circumferentially aligned with the exhaust opening.

An exemplary method of influencing back pressure on an aircraft auxiliary system exhaust includes exhausting a flow from an aircraft auxiliary exhaust, and disrupting a flow over an outer surface of an aircraft auxiliary system using an inlet opening, an inlet door, or both. The disrupting is to influence back pressure on an exhaust of the aircraft auxiliary exhaust.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
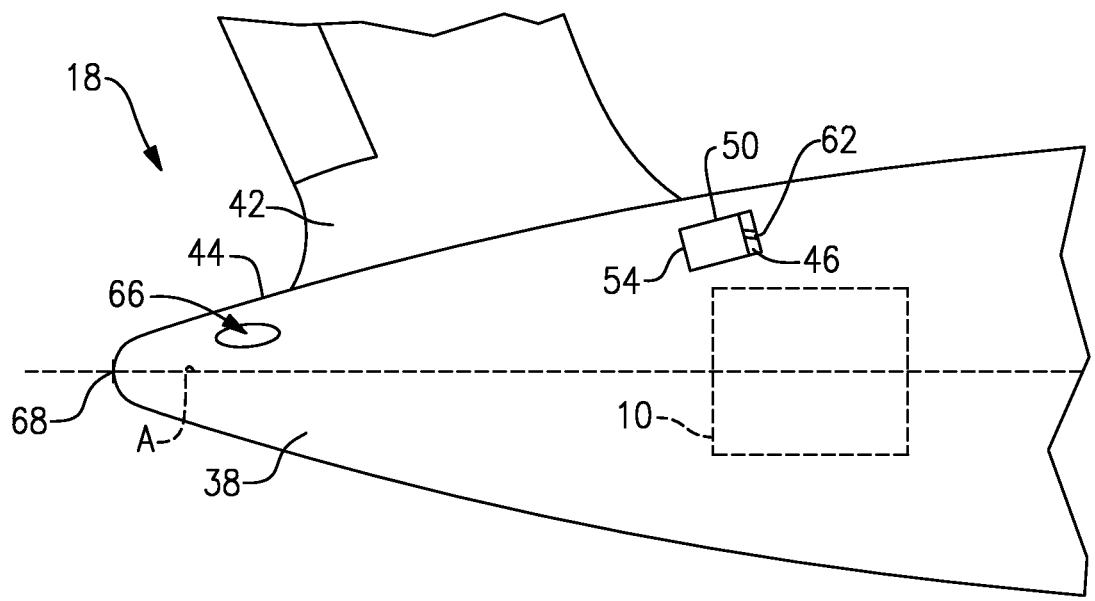
FIG. 1 shows a schematic view of an example auxiliary power unit (APU) within an aircraft tail cone.
Figure 2:
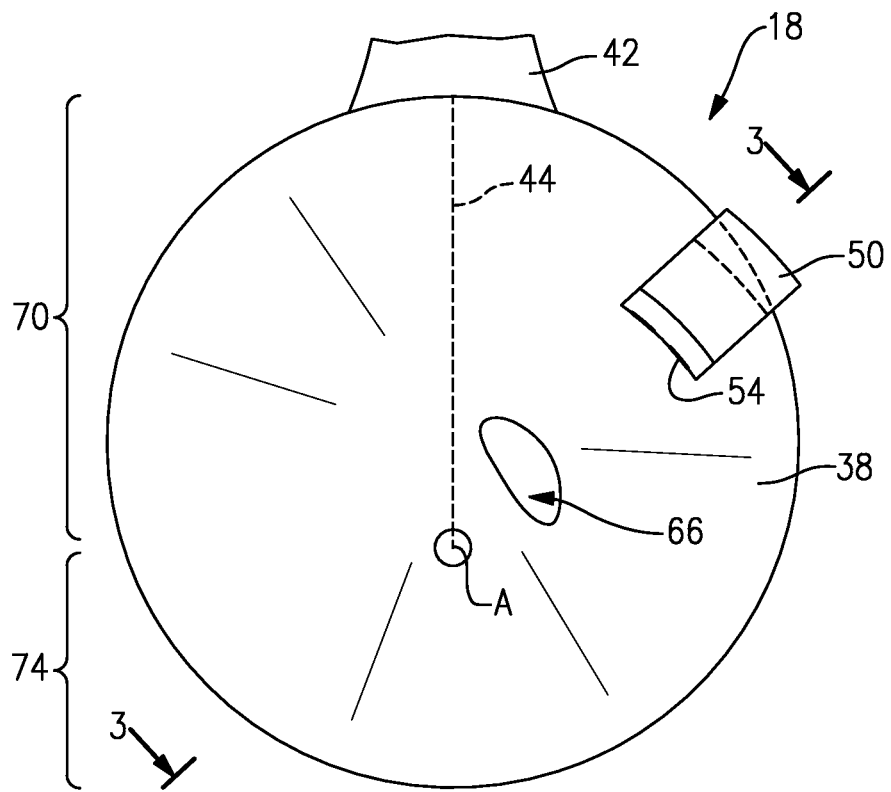
FIG. 2 shows forward-looking view at an aft end of the FIG. 1 aircraft tail cone.
Figure 3:
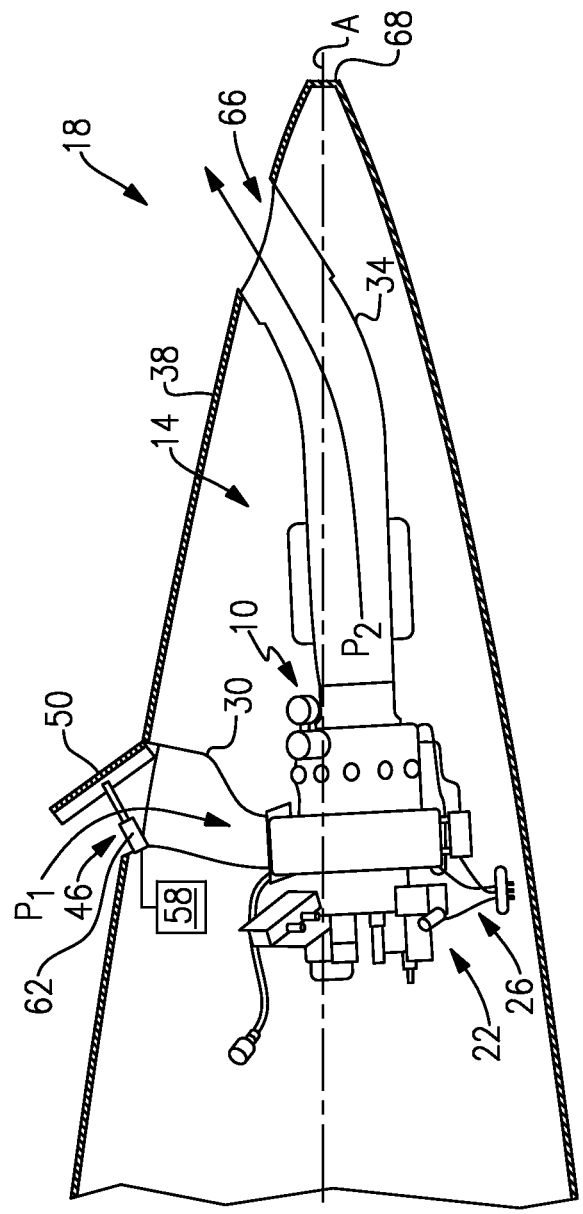
FIG. 3 shows a perspective view of the FIG. 1 APU and a section view of the aircraft tail cone at line 3-3 in FIG. 2.

Referring to FIGS. 1-3, an example APU 10 is shown arranged in a cavity 14 of a tail cone 18. An aircraft, such as an airplane or helicopter, includes the APU 10. The APU 10 is an example auxiliary system of the aircraft. The aircraft is propelled by engines other than the APU 10. Thus, the APU is a secondary engine of the aircraft.

The APU 10 includes a gearbox 22 through which a generator 26 is mechanically driven in response to rotation of a shaft-mounted compressor and turbine about an axis A.

Air from the exterior of the tail cone 18 is supplied through an inlet duct 30 to the compressor of the APU 10. The compressed air from the compressor is expanded across the turbine, and expelled through an exhaust duct 34. A person having skill in this art and the benefit of this disclosure would understand the general operation of an APU.

An outwardly-facing surface of an aircraft skin 38 faces away from the cavity 14. The outwardly-facing surface provides an aerodynamic outer mold line, or contour, of the tail cone 18. In this example, the inlet duct 30 and the exhaust duct 34 are both secured to the aircraft skin 38.

A vertical stabilizer 42 extends upwardly from the tail cone 18. The tail cone 18 has an axially extending crown 44 that bisects the vertical stabilizer 42. The vertical stabilizer 42 is an interruption in the surface of the aircraft skin 38 because the vertical stabilizer 42 protrudes from the relatively consistent outer mold line.

An inlet opening 46 is established within the skin 38. The inlet opening 46 provides a path for air to enter the inlet duct 30.

A door 50 is pivotally attached or hinged to an aft side 54 of the inlet opening 46. The door 50 is selectively opened and closed to control airflow through the inlet opening 46 into the inlet duct 30. A controller 58 connected to an actuator 62 may be used to move the door 50 between open and closed positions, or positions that restrict flow and positions that permit flow.

An exhaust opening 66 is established in the skin 38. The exhaust opening 66 provides a pathway for exhausted fluid from the APU 10 that has moved into the exhaust duct 34 to exit the tail cone 18.

In this example, air moves through the inlet opening 46 and the inlet duct 30 along a path $P_1$ when the door 50 is in an open position. The door 50 helps direct or "scoop" air into the duct 30 through the inlet opening 46.

Exhausted fluid moves away from the APU 10 through the exhaust duct 34 through the exhaust opening 66 in a path $P_2$.

Notably, fluid communicating along the paths $P_1$ and $P_2$ has a radial component over at least some of the paths $P_1$ and $P_2$. That is, fluid does not communicate in an exclusively radial direction along the entire duct 30 or the entire duct 34 relative to the direction of flow through the APU 10.

Also, the direction of fluid flow through the inlet opening 46 and the exhaust opening 66 has a radial component. The inlet opening 46 and the exhaust opening 66 face, at least partially, radially away from the axis 12, which facilitates fluid flow in the radial direction through the inlet opening 46 and the exhaust opening.

As can be appreciated, the tail cone 18 and the cavity 14 have a generally oval cross-section that tapers toward an aft end 68 of the tail cone 18. The cross-section is circular in some examples.

The tail cone 18 has an upper portion 70 and a lower portion 74. The aft end 68 is located at the vertical boundary between the upper portion 70 and the lower portion 74. The aircraft skin 38 of the upper portion 70 faces upwards, and the aircraft skin 38 of the lower portion 74 faces downwards.

Upwards and downwards, as used in this disclosure, refer to relative to a horizon when an aircraft having the APU 10 is in level flight or on the ground.

In this example, the inlet opening 46 and the exhaust opening 66 are both located in the upper portion 70. Thus, the inlet opening 46 and the exhaust opening 66 both face upwards.

The inlet opening 46 and the exhaust opening 66 are circumferentially offset from the axially extending crown 44 of the tail cone 18. More specifically, the example inlet opening 46 and exhaust opening 66 are circumferentially centered at a 2 o'clock position relative to the axis A (FIG. 2).

The vertical stabilizer 42 is at a 12 o'clock position. Thus, the vertical stabilizer is not an interruption in the surface of the aircraft skin 38 that is between the inlet opening 46 and the exhaust opening 66.

The example exhaust opening 66 is positioned within a flowpath of air moving from the inlet opening 46. That is, some or most of the air that has moved over the inlet opening 46 generally moves toward the exhaust opening 66.

Although the example inlet opening 46 and exhaust opening 66 are circumferentially aligned, other examples may include some circumferential misalignment. For example, the inlet opening 46 may be circumferentially centered at a 1:30 position and the exhaust opening 66 circumferentially centered at a 2:30 position. In such an example, at least some of the inlet opening 46 is still circumferentially aligned with at least some of the exhaust opening 66.

In other examples, no portion of the inlet opening 46 is circumferentially aligned with the exhaust opening 66. That is, the inlet opening 46 may be circumferentially spaced from the exhaust opening 66. In such example, the inlet opening 46, the door 54, or both, still disrupt airflow near exhaust opening 66 because the exhaust opening 66 is still positioned within a flowpath of air from the inlet opening 46. In such examples, the flow moves a bit circumferentially as the flow moves toward the exhaust opening 66.

Figure 4:
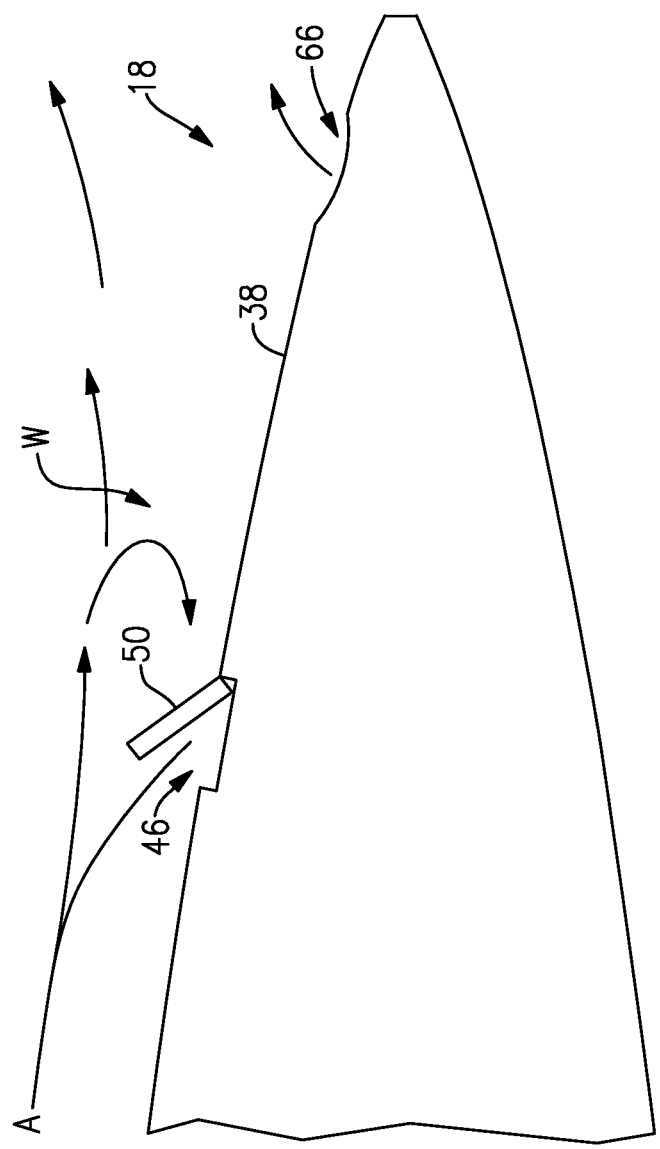
FIG. 4 schematically shows fluid flow over an exterior surface of the portion of the tail cone shown in FIG. 3.

Referring to the highly schematic view of FIG. 4, the door 50, the inlet opening 46, or both disrupt airflow A over the aircraft skin 38 when the aircraft is in flight. More specifically, the door 50, the inlet opening 46, or both, cause a wake in the airflow over the aircraft skin 38. The wake lowers the pressure at the exhaust opening 66 relative to the exhaust openings in the prior art having no wake (or no disrupted flow) from an inlet opening. The lower relative pressure facilitates flow of exhausted air through the exhaust opening 66 as part of a pressure influencing assembly formed by a combination of features disclosed herein.

Although the above disclosure describes the auxiliary power unit 10 as the auxiliary system, those skilled in this art and having the benefit of this disclosure will understand other aircraft auxiliary systems that could utilize the inlet opening 46 and exhaust opening 66. For example, an aircraft environmental control system or fluid discharge system may benefit from lowering an inlet pressure relative to an outlet pressure.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A pressure influencing assembly for an aircraft auxiliary system, comprising:
    a compressor that provides compressed air for expansion across a turbine;
    an inlet opening to the aircraft auxiliary system; and
    an exhaust opening from the aircraft auxiliary system, wherein both the inlet opening and the exhaust opening face at least partially radially away from a rotational axis of the aircraft auxiliary system, both the inlet opening and the exhaust opening circumferentially spaced from an axially extending crown of a tail cone, wherein the aircraft auxiliary system is positioned within the tail cone, and the exhaust opening is positioned within a flowpath from the inlet opening, wherein the axially extending crown extends from a vertical stabilizer to an aftmost end of the tail cone, wherein the inlet opening and the exhaust opening are circumferentially misaligned about the rotational axis, and wherein at least some of the inlet opening is circumferentially overlapping with at least some of the exhaust opening relative to the rotational axis.

2. The pressure influencing assembly of claim 1, including a door that selectively covers the inlet opening.

3. The pressure influencing assembly of claim 2, wherein the door is hinged at an aft side of the inlet opening.

4. The pressure influencing assembly of claim 1, wherein the rotational axis is aligned with a direction of flow through the aircraft auxiliary system.

5. The pressure influencing assembly of claim 1, wherein the aircraft auxiliary system is received within a cavity established by an aircraft skin of the tail cone, and the inlet opening and the exhaust opening are located within an upper portion of the aircraft skin of the tail cone, wherein the aftmost end of the tail cone is located at a planar vertical boundary between the upper portion and a lower portion of the aircraft skin of the tail cone.

6. The pressure influencing assembly of claim 1, wherein the inlet opening and the exhaust opening are configured to both face upwards relative to horizon when an aircraft having the aircraft auxiliary system has a neutral roll angle and is in straight and level flight.

7. The pressure influencing assembly of claim 1, wherein the aircraft auxiliary system is a secondary engine of an aircraft.

8. The pressure influencing assembly of claim 1, wherein the aircraft auxiliary system is received within a cavity established by an aircraft skin of the tail cone, and an outer surface of the aircraft skin is uninterrupted by any additional structure located on the outer surface between the inlet opening and the exhaust opening.

9. The pressure influencing assembly of claim 1, wherein the aircraft auxiliary system is an aircraft auxiliary power unit.

10. A pressure influencing assembly for an aircraft auxiliary system comprising:
    the aircraft auxiliary system arranged within a cavity established by an aircraft skin of a tail cone, the aircraft auxiliary system having a rotational axis and a compressor that provides a compressed air supply for expansion across a turbine;
    an inlet duct that communicates an inlet flow radially through an inlet opening in the aircraft skin to the aircraft auxiliary system; and
    an exhaust duct that communicates an exhaust flow radially through an exhaust opening in the aircraft skin away from the aircraft auxiliary system, wherein the inlet opening and the exhaust opening are circumferentially misaligned about the rotational axis, and wherein at least some of the inlet opening is circumferentially overlapping with at least some of the exhaust opening about the rotational axis, the cavity terminates at an aft end, and the exhaust opening is axially spaced from the aft end.

11. The pressure influencing assembly of claim 10, including a door that selectively restricts the inlet flow.

12. The pressure influencing assembly of claim 10, wherein the aircraft skin terminates at an aft end, and the exhaust opening is axially spaced from the aft end.

13. The pressure influencing assembly of claim 10, wherein the cavity terminates at an aft end, and the exhaust opening is axially spaced from the aft end.

14. The pressure influencing assembly of claim 10, wherein the aircraft skin has an upper portion and a lower portion, and the inlet opening and the exhaust opening are both in the upper portion, wherein the tail cone has an aftmost end located at a planar vertical boundary between the upper portion and the lower portion.

15. The pressure influencing assembly of claim 10, wherein the aircraft skin has an axially extending crown, and both the inlet opening and the exhaust opening are circumferentially spaced from the axially extending crown, wherein the axially extending crown extends from a vertical stabilizer to an aftmost end of the tail cone.

16. The pressure influencing assembly of claim 15, wherein the aircraft auxiliary system is positioned within the cavity aft of the vertical stabilizer.

17. The pressure influencing assembly of claim 10, wherein an outer surface of the aircraft skin is uninterrupted by any additional structure between the inlet opening and the exhaust opening.

18. A method of influencing pressure on an exhaust of an aircraft auxiliary system, comprising:
(a) exhausting a flow from the aircraft auxiliary system positioned within a tail cone of an aircraft, the aircraft auxiliary system including a compressor that provides a compressed air supply for expansion across a turbine; and
(b) disrupting the flow over an outer surface of the tail cone using an inlet opening, or both the inlet opening and an inlet door, to influence back pressure on an exhaust of the aircraft auxiliary system, the inlet opening and the exhaust both circumferentially offset from an axially extending crown of the aircraft auxiliary system, wherein the inlet opening is circumferentially misaligned from the exhaust about a rotational axis of the aircraft auxiliary system, wherein at least a portion of the exhaust and at least a portion of the inlet opening are circumferentially overlapping about the rotational axis, and wherein the axially extending crown extends from a vertical stabilizer to an aftmost end of the aircraft auxiliary system.

* * * * *